Figure 1:
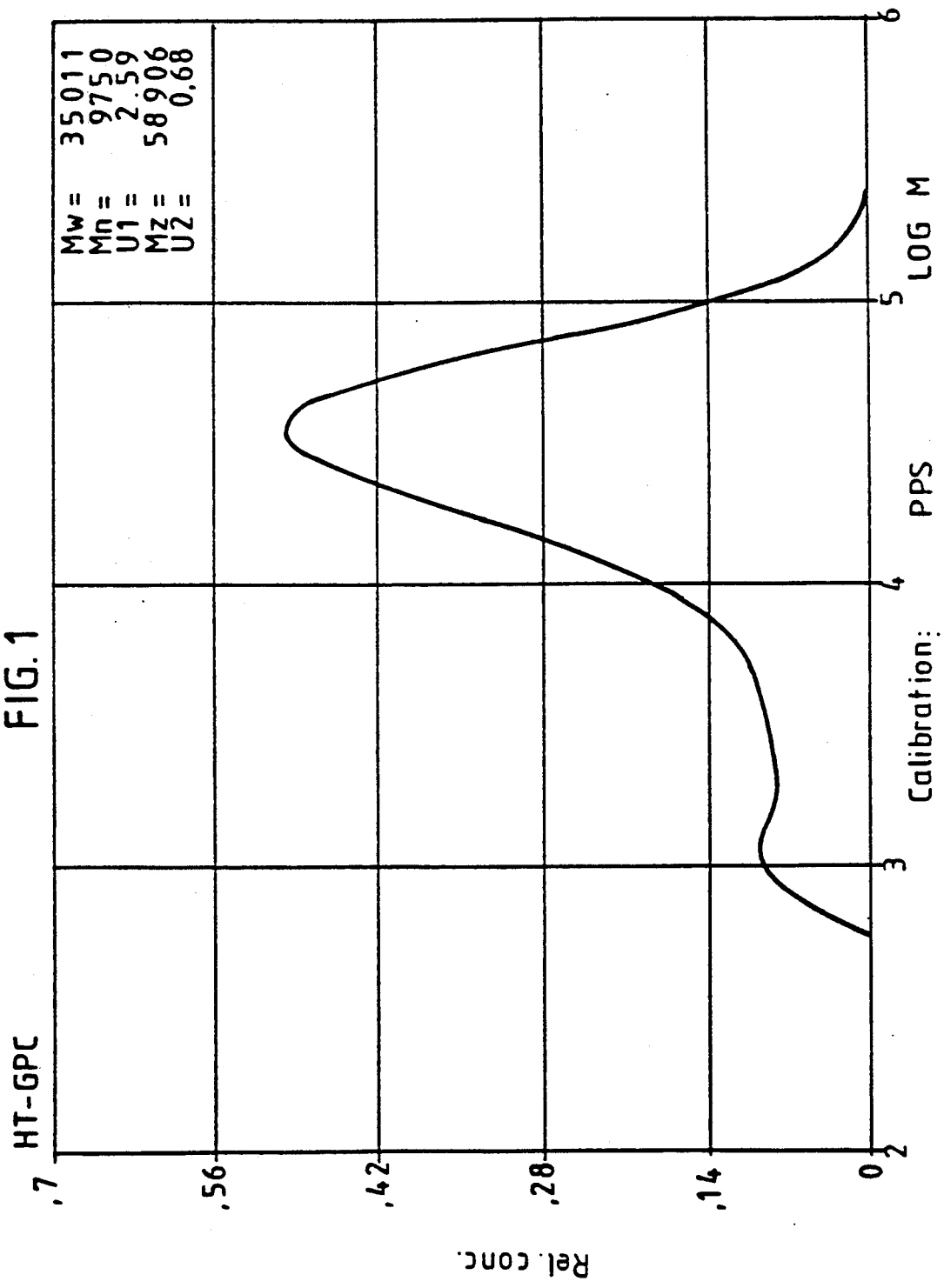

United States Patent [19]

Köhler

[11] Patent Number: 5,093,468
[45] Date of Patent: Mar. 3, 1992

[54] HIGH MOLECULAR WEIGHT COPOLYARYLENE SULFIDE

[75] Inventor: Karl-Heinz Köhler, Krefeld, Fed. Rep. of Germany

[73] Assignee: Bayer Aktiengesellschaft, Leverkusen, Fed. Rep. of Germany

[21] Appl. No.: 577,302

[22] Filed: Sep. 4, 1990

[30] Foreign Application Priority Data

Sep. 14, 1989 [DE] Fed. Rep. of Germany ....... 3930672
Dec. 21, 1989 [DE] Fed. Rep. of Germany ....... 3942416

[51] Int. Cl.$^5$ ............................................. C08G 75/16
[52] U.S. Cl. ................................... 528/388; 524/609; 528/226; 528/271; 528/362; 528/364
[58] Field of Search .............. 528/388, 226, 271, 362, 528/364; 524/609

[56] References Cited

U.S. PATENT DOCUMENTS 3,819,407  6/1974  Oates .
4,837,294  6/1989  Ichikawa et al. ................... 528/388

FOREIGN PATENT DOCUMENTS 1231030  10/1986  Japan ................................. 528/388
1-245030  9/1989  Japan ................................. 528/388

Primary Examiner—Harold D. Anderson
Attorney, Agent, or Firm—Connolly & Hutz

[57] ABSTRACT

The invention relates to high molecular weight, substantially linear copolyarylene sulfides predominantly containing biphenylene sulfide units, which are produced by reaction of aromatic halogen compounds and halobiphenylenes with sulfur donors in dipolar aprotic solvents, and to their use for moldings, films and fibers exposed to high temperatures and—preferably in reinforced form—as injection molding compounds.

6 Claims, 4 Drawing Sheets

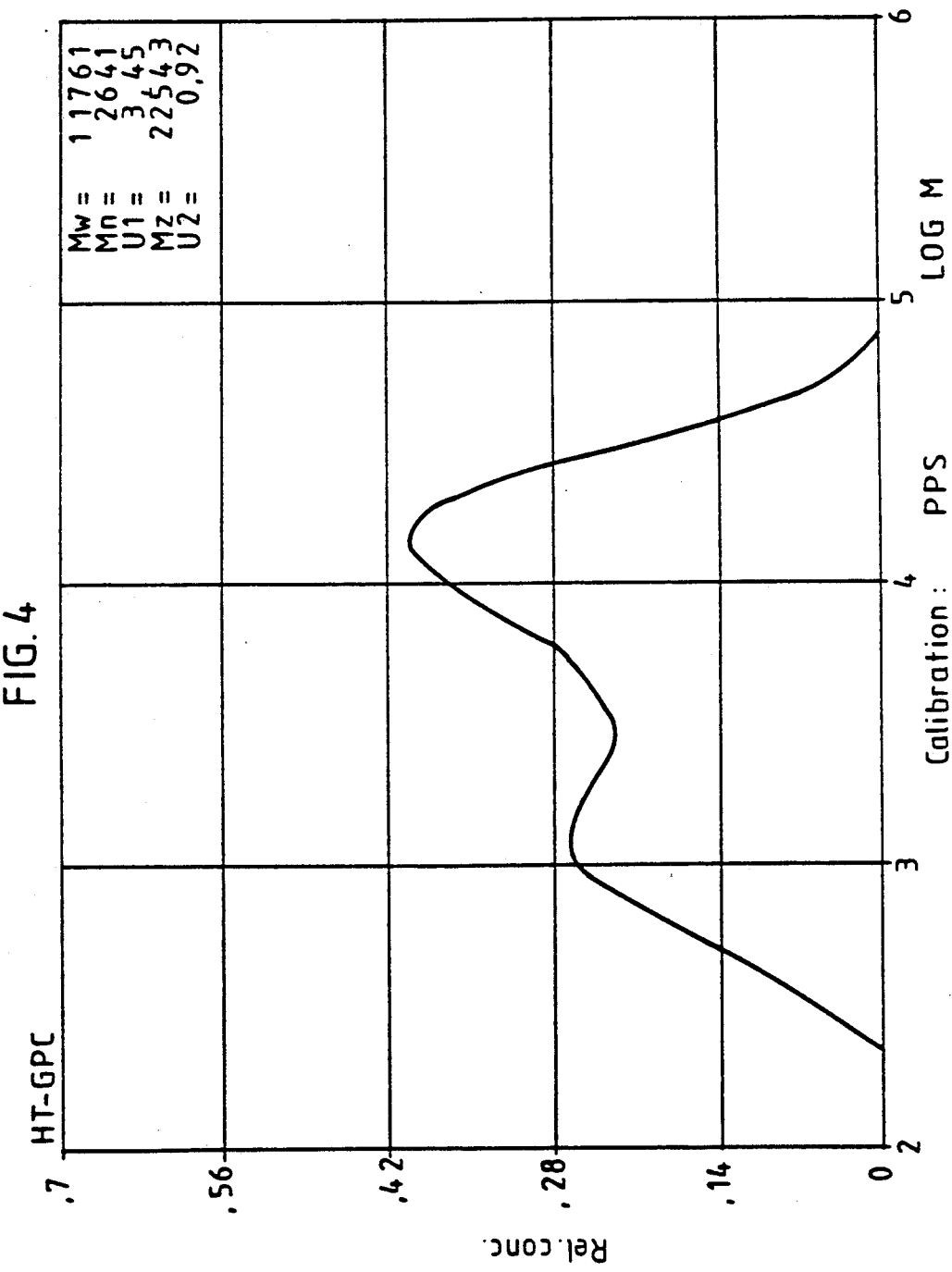

HIGH MOLECULAR WEIGHT COPOLYARYLENE SULFIDE

This invention relates to high molecular weight, substantially linear copolyarylene sulfides predominantly containing biphenylene sulfide units, which are produced by reaction of aromatic halogen compounds and halobiphenylenes with sulfur donors in dipolar aprotic solvents, and to their use for moldings, films and fibers exposed to high temperatures and—preferably in reinforced form—as injection molding compounds.

Polyarylene sulfides, particularly poly-p-phenylene sulfide (PPS), and processes for their production are known (cf. for example U.S. Pat. No 3,354,129, EP-A 171 021). PPS is commercially available and, compared with some other partly crystalline thermoplastics from the group of polyamides and polyesters, shows better resistance to heat and chemicals and excellent inherent flame resistance.

Nevertheless, there is a need in many fields of application, for example in the electronics field, for even higher heat resistance coupled with high resistance to chemicals and favorable processing properties of the thermoplastics.

Relatively high heat resistance can be expected, for example, from polymers containing a relatively high proportion of aromatics. Examples of such polymers are polyarylene sulfides made up of biphenylene units. Polyarylene sulfides such as these are known (for example from U.S. Pat. No. 3,354,129).

In addition to their high thermal stability, polyarylene sulfides of the type in question show very high resistance to chemicals which is consistent with the substantial chemical inertia of the polymer chain.

On account of their extremely high melting points, they are difficult to process as thermoplastics.

Copolyarylene sulfides of biphenylene sulfide and phenylene sulfide units have lower melting points than biphenylene sulfide homopolymers. The same applies in particular to mixtures thereof with PPS (cf. for example EP-A 287 396).

Although mixtures such as these can readily be processed as thermoplastics, particularly in reinforced form, they no longer have the superior properties of pure copolyarylene sulfides compared with PPS because the crystallization of these reinforced (for example glass-fiber-reinforced) mixtures is considerably reduced. This is reflected, for example, in a heat distortion temperature (for example HDT-A) which is the same as or lower than that of corresponding PPS compounds. The heat resistance of reinforced polyarylene sulfide mixtures can only be increased to a level above that of PPS by conditioning at temperatures below the melting point.

It has now been found that pure copolyarylene sulfides based on biphenylene sulfide which, in addition, contain clearly defined smaller quantities of other arylene sulfide units can readily be processed as thermoplastics, even in reinforced form, in contrast to mixtures of such copolyarylene sulfides with PPS, and, at the same time, show greatly improved thermal properties.

Copolyarylene sulfides of the type in question are partly crystalline and have melting points and glass transition temperatures above those of PPS. They have a sufficiently high crystallization rate and show distinctly improved heat resistance and long-term thermal stability compared with PPS.

The melt viscosities at processing temperatures are comparable with those of PPS.

It is known that biphenylene sulfide homopolymers and copolymers can be produced from 4,4'-dibromobiphenyl and sodium sulfide in N-methyl pyrrolidone by known methods for the synthesis of PPS (for example EP-A 287 396). Although polybiphenylene sulfides such as these show improved thermal properties in relation to PPS, their molecular weight is comparatively low and their molecular non-uniformity very high.

Figure 2:
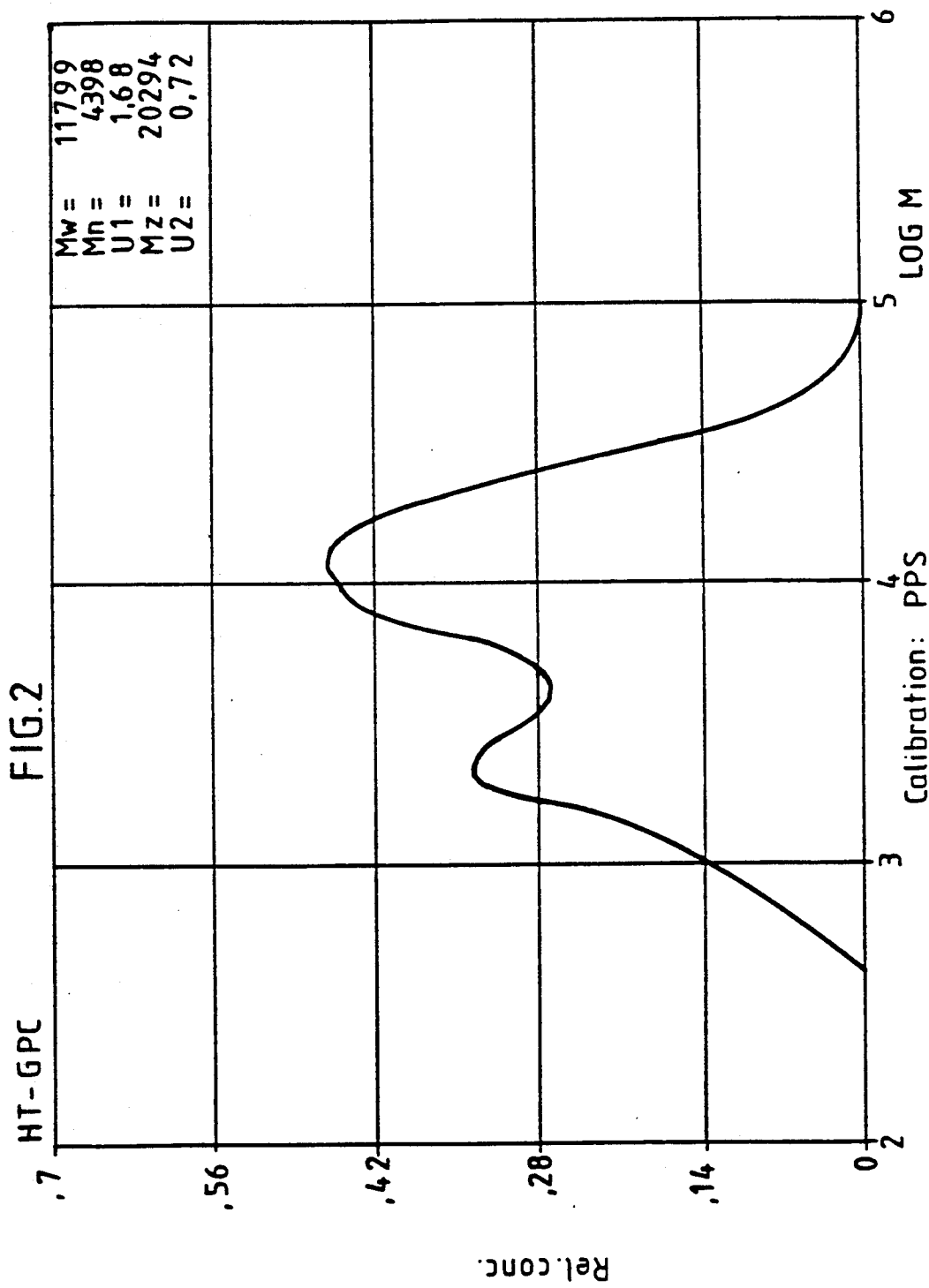

The high non-uniformity is reflected in a high oligomer content which can be seen before the main maximum of the molecular weight distribution in a high-temperature gel permeation chromatograph (as described, for example, in DE-A 3 529 498, see FIG. 2, Comparison Example I, and FIG. 4, Comparison Example III).

It has now been found that biphenylene sulfide homopolymers and copolymers having distinctly higher molecular weights and a much lower molecular non-uniformity can be produced if 4,4'-dibromobiphenyl is replaced by 4,4'-dichlorobiphenyl in their production.

Polybiphenylene sulfides thus produced have comparable thermal properties, but—by virtue of their higher molecular weight—considerably better mechanical properties.

The copolyarylene sulfides produced in accordance with the invention are made up of 50 to 95 mol-% (based on I + II) recurring biphenylene sulfide units corresponding to formula (Ia) or (Ib)

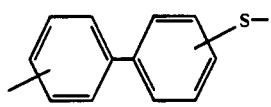  (Ia)

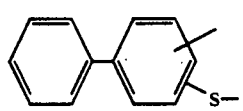  (Ib)

and 5 to 50 mol-% (based on I+II) recurring arylene sulfide units corresponding to formula (II)

  (II)

in which A represents —Ar—R—with

Ar=$C_{6-24}$ C aromatic radical other than biphenyl or a heterocyclic radical containing 5 to 14 ring atoms, up to 3 ring C atoms being replaceable by heteroatoms, such as N, O, S, or a $C_{6-24}$ aromatic alkyl radical, and R=a single bond, O—Ar, S—Ar,

SO—Ar, $SO_2$—Ar where Ar is as defined above.

These copolyarylene sulfides may additionally contain monomer units corresponding to formula (III)

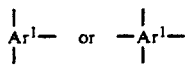

IIIa    IIIb in quantities of up to 5 mol-% and preferably in quantities of 0.1 to 0.5 mol-%, based on the sum of the monomer units (I) and (II), $Ar^1$ being an aromatic $C_{6-24}$ radical, a heterocyclic radical containing 5 to 14 ring atoms, up to 3 ring C atoms being replaceable by heteroatoms, such as N, O, S.

The copolyarylene sulfides may optionally contain monomer units corresponding to formula (IV)

   (IV)

where Ar is as defined for formula (II), at the end of the polymer chain in quantities of up to 5 mol-% and preferably in quantities of from 0.7 to 3 mol-%, based on the sum of the monomer units (I) and (II) and optionally (III).

Accordingly, the copolyarylene sulfides consist predominantly of recurring biphenylene sulfide monomer units and have the following physical properties:

a) melting temperatures $T_M$ in the range of from 300° C. to 405° C.
b) a glass transition temperature $T_G$ in the range from 100° C. to 195° C.
c) enthalpies of crystallization $\Delta H_k$ and enthalpies of fusion $\Delta H_M$ of more than 10 J/g
d) a $\Delta T$, defined as $\Delta = T\ T_M - T_K$, where $T_K$ is the crystallization temperature of the polymer melt, below 40° K.
e) a melt viscosity $\eta_M$ at processing temperatures and at a shear rate of $10^3$ (1/s) of more than 10 Pa.s and less than 200 Pa.s.

The thermal data $T_M\ T_G$, $T_K$, $H_K$ and $H_M$ are determined by differential scanning calorimetry (DSC), for example using a Perkin-Elmer DSC 2, the sample being heated to approximately 30° K. above the melting point at a heating rate of 20° K/min., cooled to approximately room temperature at a cooling rate of 30° K/min. after a residence time in the melt of at least 2 minutes and then reheated above the melting point at the same heating rate. $T_K$ is the maximum of the crystallization peak in the cooling curve of the melt, $T_M$ is the maximum of the melting peak during the second heating. The difference between $T_M$ and $T_K$ is a measure of the crystallization rate of the copolyarylene sulfide.

The melt viscosities $\eta_M$ (eta-M), dimension (Pa.s), are measured in a commercial high-pressure capillary viscosimeter at a suitable melt temperature and at various shear rates $\gamma$ (gamma point), dimension (1/s). From the viscosity functions thus obtained, the melt viscosity at a shear rate of $10^3$ (1/s) in Pa.s is always as a comparison value. Since the copolyarylene sulfides have different melting points according to their chemical composition, it is not possible to state a single measurement temperature for all copolymers. Accordingly, a suitable melting temperature is the processing temperature of the particular copolyarylene sulfide and may be situated, for example, approximately 30° K. above the melt temperature $T_M$ determined by DSC.

The copolyarylene sulfides have very different thermal properties, particularly $T_M$, $T_K$, $\Delta H_M$, in dependence upon their chemical composition. For example, copolyarylene sulfides of 4,4,-biphenylene sulfide units and 1,4-phenylene sulfide units show increasingly higher and narrower softening ranges or melting points $T_M$ with increasing content of biphenylene sulfide units. At the same time, the crystallization temperatures $T_K$ and also the enthalpies of crystallization and fusion $\Delta H_K$ and $\Delta H_M$ also increase. $\Delta T$ (defined as $\Delta T = T_M - T_K$) also decreases in the same way.

Sufficiently rapid and sufficiently high crystallization is desirable for the processing of these copolyarylene sulfides as thermoplastics. Accordingly, a high percentage content of biphenylene units (I) is favorable. Copolyarylene sulfides having a very high content of biphenylene units are suitable for processing as sintering powders, for example in sintering presses, or for coatings, whereas copolyarylene sulfides having a low content of biphenylene units tend to crystallize more slowly and incompletely.

The choice of a suitable chemical composition of a copolyarylene sulfide for a specific application is determined not only by the thermal properties, but also by the particular molecular weights $\overline{M}_w$ obtainable, as determined by high-pressure/temperature gel chromatography, or the melt viscosity, as determined by high-pressure capillary viscosimetry. Thus, the molecular weight $\overline{M}_w$ of the copolyarylene sulfide decreases distinctly with increasing content of biphenylene units in the copolyarylene sulfide. At the same time, increasingly poor solubility of the copolyarylene sulfides in the reaction medium during the synthesis is observed. The level of the molecular weight obtainable is not without influence on the mechanical properties of the copolyarylene sulfides after processing.

Copolyarylene sulfides having improved, balanced thermal and mechanical properties, so that they may readily be processed as thermoplastics, should contain the various monomer units in special clearly defined ratios to one another.

In addition to the molar ratios of the monomer units, the isomer purity of the dihalobiphenyl used is of considerable importance, particularly with relatively high biphenyl contents. $T_M$ and $T_K$ can be appreciably reduced with increasing quantities of isomer impurities, such as for example 4,2'-isomers.

Accordingly, the copolyarylene sulfides preferably contain 65 to 80 mol-% 4,4'-biphenylene sulfide units, the percentage content of other position-isomeric biphenylene sulfide units being less than 0.1 mol-% and preferably less than 0.03 mol-%, based on biphenylene sulfide units, and 35 to 20 mol-% of 1,4-phenylene sulfide units with a percentage content of position-isomeric phenylene sulfide units of less than 0.1 mol-% and preferably less than 0.05 mol-based on phenylene sulfide units (the mol-% are based on the sum of the monomer units).

The copolyarylene sulfides are further characterized by melting point maxima $T_M$ between 305° and 375° C., by crystallization maxima Tx of the solidifying polymer melts between 270° C. and 360° C. and by enthalpies of crystallization and fusion between 20 and 55 J/g, the higher values corresponding to the copolyarylene sulfides with the greater percentage content of biphenylene units. These thermal data are measured by DSC, as described above.

The melt viscosities may be measured, for example, at 380° C. and, for a shear rate of $10^3$ (1/s), are in the range from 10 to 180 Pa.s and preferably in the range from 20 to 100 Pa.s.

These melt viscosities are determined in a high-pressure capillary viscosimeter, for example of the type made by Göttfert. To this end, the polymer melt accommodated in a correspondingly heatable channel 170 mm long and 9.5 mm in diameter, is forced through a nozzle 30 mm long and 1 mm in diameter under loads of approximately 20 to 600 kg by means of a plunger. Different shear rates are produced by the different loads.

The molecular weights $M_w$ (weight average; as measured by high-temperature gel chromatography, for example in accordance with DE-OS 3 529 498) are in the range from 20,000 to 100,000 g/mol and preferably in the range from 30,000 to 60,000 g/mol, copolyarylene sulfides having a higher percentage content of biphenylene units tending to have lower molecular weights. The molecular weights and melt viscosities may be further increased by the additional introduction of branching agents (monomer units III).

For comparable weight average molecular weights $\overline{M}_w$, polybiphenylene sulfides produced from 4,4'-dichlorobiphenyl have a lower non-uniformity than polybiphenylene sulfides produced from equal molar quantities of 4,4'-dibromobiphenyl.

The molecular non-uniformity U may be characterized by the following relation:

$$U = \left[ \frac{\overline{M}_w}{\overline{M}_n} - 1 \right]$$

where $\overline{M}_w$ is the weight average molecular weight and $\overline{M}_n$ is the number average molecular weight.

The polymers produced in accordance with the invention have $\overline{M}_w$ values in the range from 11,000 to 100,000 and U values in the range from 1.9 to 4.9.

For an experimentally determined $\overline{M}_w$ value, there is an $\overline{M}_n$ value which may be experimentally determined. For an experimentally determined $\overline{M}_n$ value, there is an $\overline{M}_w$ value which may be experimentally determined.

The present invention relates to a process for the production of the copolyarylene sulfides described above and to the copolyarylene sulfides produced by this process, in which a) 50 to 95 mol-%, preferably 50 to 80 mol-% and more preferably 65 to 80 mol-% dichlorobiphenyls corresponding to formulae (Va) and/or (Vb)

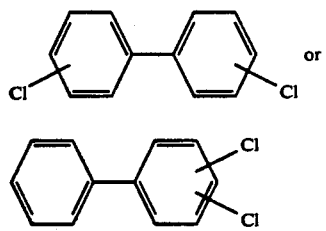

and 50 to 5 mol-%, preferably 50 to 20 mol-% and more preferably 35 to 20 mol-% aromatic dihalogen compounds corresponding to formula (VI)

X—A—X (VI)

in which A is as defined for formula II and X is halogen, preferably Cl, and b) 0 to 5 mol-% and preferably 0.1 to 0.5 mol-%, based on a), of an aromatic trihalogen or tetrahalogen compound corresponding to formula (VII)

$Ar^2X_n$ (VII)

in which
Ar$^2$ is a $C_{6-24}$ C aromatic radical other than biphenyl or a heterocyclic radical containing 5 to 14 ring atoms, up to 3 ring C atoms being replaceable by heteroatoms, such as N, O, S, or a $C_{6-24}$ aromatic alkyl radical,
X is halogen, preferably chlorine, and
n is the number 3 or 4,
are reacted with c) alkali sulfides and/or alkali hydrogen sulfides, preferably sodium or potassium sulfide or mixtures thereof, preferably in the form of their hydrates or aqueous mixtures, optionally together with small quantities of alkali hydroxides, such as sodium and potassium hydroxide, the molar ratio of (a+b):c being from 0.75:1 to 1.25:1, d) optionally in the presence of catalysts, such as alkali carboxylates, alkali phosphates, alkali phosphonates, alkali fluorides, alkali alkyl sulfonates or N,N-dialkyl carboxylic acid amides, 0.2 to 50 mol-% and preferably 0.2 to 25 mol-%, based on mols aromatic dihalogen compounds, of an amino acid optionally being added to the reaction mixture, e) optionally in the presence of aromatic monohalogen compounds corresponding to formula (VIII)

R—Ar—X (VIII)

in which
X is halogen, such as Cl or Br,
Ar is as defined for formula (VII),
R represents H or has the meaning defined for formula (II),
the reaction of the components being carried out in a polar aprotic solvent in the presence of an entraining agent at temperatures which enable the water to be simultaneously removed by distillation. The reaction is preferably carried out at normal pressure.

Alkali sulfides can also be produced from H$_2$S and alkali hydroxides or from hydrogen sulfides and alkali hydroxides.

The removal of water by distillation may be carried out directly or using entraining agents, the aromatic dihalogen compounds preferably being used as entraining agents. For the removal of water, all the reactants may be mixed and the water removed from the mixture as a whole. The reaction components may be added in any other order before and after the removal of water.

Under typical reaction conditions, the removal of water by distillation using aromatic halogen compounds as entraining agents is limited by the molar ratios of the aromatic dihalogen compounds V and VI to one another, particularly with percentage contents of less than 20 mol-% aromatic dihalogen compounds VI.

In cases such as these, water may be azeotropically removed from the alkali sulfide with a suitable excess of VI at temperatures below 200° C. and, after the water has been removed, the excess of VI may be distilled off from the reaction mixture. Instead of using an excess of VI, other suitable inert entraining agents may be used to remove the water, being redistilled from the reaction mixture. The addition times or water removal times are preferably from 2 to 4 hours. Another variant of the removal of water from the alkali sulfide hydrate comprises azeotropic distillation in a separate preliminary step using a suitable entraining agent, such as for example toluene or mesitylene, optionally in the presence of catalysts as described under d).

The very fine-grained anhydrous alkali sulfide isolated may be immediately introduced into the reaction with the aromatic halogen compounds and the solvent.

The removal of water from the alkali sulfide hydrate may also be carried out by distilling off the water at elevated temperature in the absence of aromatic halogen compounds in a substantially inert, non-hydrolyzable aprotic dipolar solvent, such as for example N-methyl caprolactam or N,N-dimethyl imidazolidinone. The aromatic halogen compounds may be introduced together or separately into the anhydrous alkali sulfides in aprotic dipolar solvents, which may optionally contain the catalysts mentioned above, and reacted at temperatures above 200° C.

Where the removal of water is carried out in the presence of aromatic halogen compounds, the order in which the aromatic halogen compounds V and VI are added may be specifically varied to promote reactions of one group of aromatic halogen compounds with one another and thus to promote the formation of block copolymers over statistical copolymers. For example, the aromatic halogen compounds VI may be initially introduced into the reaction mixture and the aromatic halogen compounds V subsequently added and reacted, for example after the removal of water.

All the reactants are preferably combined continuously together with amino acids in the presence of the polar solvent with simultaneous removal of the water. Where this procedure is adopted, an incipient reaction may be controlled through the addition rates. Prolonged residence times of the water can thus be avoided.

Where the water is completely removed, the reaction may be carried out in the absence of pressure or under a low pressure of up to about 3 bar. To obtain higher reaction temperatures beyond the boiling point of the solvent or the mixture of solvent and aromatic dihalogen and polyhalogen compounds, higher pressures of up to 50 bar may be applied.

The reaction times and temperatures in the range from 230° C. to 250° C. are at least 5 hours and preferably more than 10 hours. The reaction time can be shortened by increasing the temperature under pressure or by using relatively high boiling solvents or by the presence of suitable catalysts.

The reaction mixture may be worked up and copolyarylene sulfides may be isolated by methods known per se.

The copolyarylene sulfides may be removed from the reaction solution in known manner, for example by filtration or centrifugation, either directly or after dilution with solvents or, for example, after the addition of water and/or dilute acids or organic solvents with minimal dissolving power for polyarylene sulfides. After the product has ben separated off, it is generally washed with protic solvents, for example water. Washing or extraction with other washing liquids (for example ketones, such as acetone), which may be carried out in addition to or after the main wash, is also possible.

The reaction solution may also be solidified by suitable measures, subsequently taken up in the solvents mentioned and further processed as described above.

According to the invention, it is possible to use aromatic dihalogen compounds corresponding to formulae V and VI and, optionally, aromatic monohalogen compounds corresponding to formula VIII or aromatic polyhalogen compounds corresponding to formula VII (as regulators).

Examples of dihalodiphenyls corresponding to formulae (Va) and (Vb) suitable for use in accordance with the invention are 2,5'-dichlorobiphenyl, 2,3'-dichlorobiphenyl, 2,2'-dichlorobiphenyl, 3,4'-dichlorobiphenyl, 3,3'-dichlorobiphenyl, 4,4'-dichlorobiphenyl, 4,2'-dichlorobiphenyl.

The preferred aromatic dihalogen compound of formula V is 4,4'-dichlorobiphenyl. It is particularly preferred to use a 4,4'-dichlorobiphenyl having an isomer purity of more than 99.9% 4,4'-position isomers and, more particularly, an isomer purity of greater than 99.95% 4,4'-dichlorobyphenyl. The isomer purity is determined by gas chromatography using calibration substances.

Mixtures of different isomers, such as for example 4,2'- and 4,4'-dichlorobiphenyl, can impair the thermal properties, such as melting and crystallization temperature, in some cases seriously, depending on the mixing ratio. Accordingly, high isomer purity is necessary for the synthesis of copolyarylene sulfides according to the invention having good thermal properties.

Dichlorobiphenyls may be produced, for example, by known methods of sulfochlorination of biphenyl, which is highly selective, and subsequent elimination of $SO_2$; the isomer purity can be maximized by suitable recrystallization. Another method comprises the direct chlorination of biphenyl using suitable zeolites.

The following are examples of aromatic dihalogen compounds of formula VI suitable for use in accordance with the invention: 1,4'-dibromobenzene, 1,4'-dichlorobenzene, 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,3,4,5-tetramethyl-2,5-dichlorobenzene, 1-cyclohexyl-2,5-dichlorobenzene, 1-phenyl-2,5-dichlorobenzene, 1-benzyl-2,6-dichlorobenze, 1-phenyl-2,5-dibromobenzene, 1-p-tolyl-2.5-dichlorobenzene, 1-p-tolyl-2,5,-dibromobenzene, 1-hexyl-2,5-dichlorobenzene, 1,5'-dichloronaphthalen, 2.6'-dichloronaphthalene, 1,5-dichloroanthracene, 4,4'-dichlorobenzophenone, 4,4'-dichlorodiphenyl sulfone, 4,7-dichloroquinoline, 2,4-dichloro-1,3,5-triazine, 2,6-dichlorobenzonitrile, 4,3'-dichlorophthalanil; they may be used individually or in admixture, preferably individually. 1.4-Dichlorbenzene is preferred.

Examples of aromatic monohalogen compounds of formula VIII which may optionally be used in accordance with the invention are phenol, thiophenol, isooctylphenols, 4-mercaptobisphenyl, 3-chlorobiphenyl, 4-chlorbiphenyl, 4-bromobiphenyl, 4-bromodiphenyl sulfide, 4-chlorodiphenyl sulfide, 4-chlorodiphenyl sulfone, (4-chlorophenyl)-phenyl-ketone, (3-chlorophenyl)-phenylketone. The aromatic monohalogen compounds may be added before or during the reaction, individually or in the form of a mixture of aromatic halogen compounds or in portions at certain times during the reaction.

Examples of aromatic trihalogen or tetrahalogen compounds corresponding to formula VII which may be used in accordance with the invention are 1,2,3-trichlorobenzene, 1,2,4-trichlorobenzene, 1,2,4-tribromobenzene, 1,3,5-trichloro-2,4,5-trimethylbenzene, 1,2,3- trichloronaphthalene, 1,2,4-trichloronaphthalene, 1,2,6-trichloronaphthalene, 1,2,4-trichlorotoluene, 2,3,6-trichlorotoluene, 1,2,3,4-tetrachloronaphthalene, 1,2,4,5-tetrachlorobenzene, 2,2', 4,4'-tetrachlorobiphenyl, 1,3,5-trichlorotriazine.

Any polar solvent which guarantees adequate solubility of the organic and optionally inorganic reactants under the reaction conditions may generally be used for the reaction. N-alkyl lactams and cyclic N-alkyl ureas are preferably used.

N-alkyl lactams are those of N-alkylamino acids containing 3 to 11 carbon atoms, which may optionally bear substituents inert under the reaction conditions on the carbon chain.

Examples of N-alkyl lactams are N-methyl caprolactam, N-ethyl caprolactam, N-isopropyl caprolactam, N-isobutyl caprolactam, N-propyl caprolactam, N-butyl caprolactam, N-cyclohexyl caprolactam, N-methyl-2-pyrrolidone, N-ethyl-2-pyrrolidone, N-isopropyl-2-pyrrolidone, N-isobutyl pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isobutyl-2-piperidone, N-methyl-6-methyl-2-piperidone, N-methyl-3-ethyl-2-piperidone.

It is also possible to use bislactams attached to the nitrogen atom by alkylene groups, such as for example bis-(N-1,4-butylene)-caprolactam, bis-(N-1,6-hexylene)-caprolactam, bis-(N-1,4-butylene)-2-pyrrolidone.

Examples of cyclic N-alkyl ureas are N,N-dimethyl imidazolidinone, N-N'-dimethyl-1,3-perhydrodiazin-2-one, N,N'-dimethyl-1,3-perhydrodiazepin-2-one.

Mixtures of the solvents mentioned above may be used.

the particularly preferred solvent is N-methyl caprolactam (NMC).

Preferred amino acids are open-chain or cyclic aliphatic $C_{1-20}$ amino acids which may contain lateral groups, such as for example $_{1-4}$ aloxythio-$C_{1-4}$-alkyl groups of a heterocyclic $C_{6-14}$ group containing up to three heteroatoms, such as N, O, S. The amino group may be present as an $NH_2$-NRH or $NR_2$ group, where R is an alkyl group, preferably a $C_{1-4}$ alkyl group. Two groups R may also be situated at both ends of an alky chain with a lateral carboxyl group which forms a ring with the NH group.

The amino group may be fixed in the 60 -, β-, γ- or ω-position. Diamino acids or aminocarboxylic acids may also be used.

The following amino acids are mentioned by way of example: glycine, α-alanine, β-alanine (α- and β-aminopropionic acid), α-aminobutyric acid, γ-aminobutyric acid, α-aminoisovaleric acid (valine), α-aminoisocaproic acid (leucine), ε-aminocaproic acid, 11-aminoundecanoic acid, N-methylaminoacetic acid (sarcosine), N-methyl-α-aminopropionic acid, N-methyl-γ-aminobutyric acid, N-methyl-ε-aminocaproic acid, N-methyl11-aminoundecanoic acid, aminobutanedioic acid (aspartic acid), 2-aminopentanedioic acid (glutamic acid), 2-amino-4-methylthiobutanoic acid (methionine), phenyl alanine, proline.

The reaction may also be carried out in the presence of typical catalysts such as, for example, alkali carboxylates (DE-A 2 543 749), lithium halides or alkali carboxylates (DE-A 2 623 362), lithium chloride or lithium carboxylate (DE-A 2 623 363), alkali carbonates in combination with alkali carboxylates (U.S. Pat. No. 4,038,259), lithium acetate (DE-A 2 930 710), trialkali phosphonates (DE-A 2 030 797), alkali fluorides (DE-A 3 019 732), alkali sulfonates (U.S. Pat. No. 4,038,260), lithium carbonate and lithium borate (U.S. Pat. No. 4,030,518).

The reaction should preferably be carried out in apparatus which are unable to introduce any impurities into the reaction mixture in the form of metal traces, for example of Fe, Co, Ni or Cu in metallic or ionic form. Advantageous materials for parts of the reaction apparatus which are in contact with the reaction solution or with sulfide solution are titanium and special stainless steels.

The present invention also relates to the use of the copolyarylene sulfides described above the production of moldings, fibers, films and injection molding compounds.

To this end, the copolyarylene sulfides according to the invention may be mixed with fibrous and particulate fillers and reinforcing materials in quantities of up to about 70% by weight based on the sum of polymer plus filler (or reinforcing material). Examples of fillers are quartz, kaolin, mica, talcum, $BaSO_4$, gypsum, glass beads, precipitated pyrogenic silica, metal oxides, such as $TiO_2$ for example, metal sulfides, such as ZnS for example, carbon black, graphites, metal powders. Examples of reinforcing fibers are glass fibers, carbon fibers, whiskers, metal fibers, aramide fibers, boron nitride fibers. The fillers are reinforcing materials may be used individually or in admixture with one another.

They may contain suitable sizes and coupling agents which promote attachment to the polymer, particularly in the case of glass fibers.

Both in non-reinforced form and in reinforced form, the copolyarylene sulfides may contain typical additives, such as heat stabilizers, antioxidants, flow aids, pigments and/or mold release agents.

Preferred fillers are quartz, kaolin, mica, talcum, gypsum, glass beads; preferred reinforcing materials are silanized glass fibers and carbon fibers, more particularly silanized glass fibers having a fiber diameter of 3 to 15 μm and preferably of the order of 10 μm.

The fillers and reinforcing materials may be incorporated in the copolyarylene sulfides according to the invention by melt compounding of the components in standard units, such as for example kneaders, internal mixers or extruders, at melt temperatures approximately 30° K. above the melting temperature $T_M$ of the copolyarylene sulfide. Kneaders and twin-screw extruders are preferably used.

These reinforced copolyarylene sulfides may be processed to moldings of any kind in standard injection molding machines. To obtain thoroughly crystallized moldings, the mold temperatures must be sufficiently far above the glass temperatures, preferably 20° to 30° K. above $T_G$. Thermal properties, such as heat resistance for example, may thus be optimally utilized. Another method of increasing heat resistance is to condition the moldings for periods of from about 2 to about 5 hours at temperatures 100° to 150° K. above $T_G$ or 50° to 100° K. below the melting point $T_N$ of the copolyarylene sulfide. Heat resistance can be maximized in this way.

The present invention also relates to the use of the copolyarylene sulfide for the production of films. The copolyarylene sulfides used for this purpose are preferably unfilled, although they may also contain finely divided fillers to obtain a certain surface roughness or coefficient of friction. The films may be produced in known manner by extrusion through a sheeting die. The processing temperature is 5° to 80° K. and preferably 10° to 50° K. above the melting point. The melt issuing from the die passes onto a rotating roller heated to a maximum temperature of 100° to 120° C. and is cooled below the crystallization temperature so rapidly that an amorphous film is formed.

The film may be monoaxially or biaxially stretched at room temperature or at elevated temperature, preferably in the range from $T_g$ to $T_k$. The stretching ratio may be from 4 to 14, preferably in the direction of the machine, and from 2.0 to 3.5 transversely thereof. The biaxial stretching may be carried out sequentially or simultaneously. The film is then heat-set at temperature above $T_k$ and below the melting temperature.

The present invention also relates to the use of the copolyarylene sulfides for the production of filaments and fibers.

The copolyarylene sulfides are spun by standard melt spinning processes, generally with no special requirements to be satisfied. The processing temperature is 5° to 100° C. above the melting point of the polymer and preferably 10° to 50° C. above the melting point of the polymer.

The spun material is then stretched in the solid state. Stretching is carried out at room temperature preferably at elevated temperature, but always below the melting point of the polymer, more preferably at a temperature in the range from 70° C. to 150° C. The overall stretching ratio is preferably from 4 to 10.

Stretching may be carried out, for example, in air, water or other heat transfer media or on contact heaters.

Stretching may be carried out in one or more stages.

The stretching process is preferably followed by a setting step, for example to improve the thermal properties, more especially by reducing boiling-induced shrinkage and thermal shrinkage.

The setting step may be carried out continuously or discontinously, preferably continuously.

The setting step may be carried out under tension or in the absence of tension, preferably under tension, at temperatures below the melting point of the polyarylene sulfide, preferably at a temperature up to 100° C. and, more preferably, 50° C. below the melting point. The residence times at those temperatures are from 1 second to 10 minutes and preferably from 10 seconds to 200 seconds.

Fibers having a high degree of crystallinity can be produced in the setting step.

The fibers according to the invention are distinguished by their problem-free production. No stabilizers are necessary to prevent the fibers from hardening during spinning, which could lead to the formation of gel particles. Nor is there any need for special filtration processes; standard die filters having bore diameters of 40 to 20 μm are sufficient for preventing filament yarn breaks during spinning and stretching.

Another advantage of the process according to the invention is that no gases are given off during processing of the polymers and the spun material is free from vacuoles.

Spinning is carried out by standard melt spinning processes and does not involve any special precautions; in particular, any standard filament guides may be used.

Compared with standard textile fibers, there is no increase in the frequency of filament breaks during spinning and stretching.

The spun material obtained is not brittle, can be stretched without difficulty and crystallizes during a brief, continuous heat-setting step.

The fibers and filaments according to the invention may be subjected without difficulty to standard textile processing.

Commensurate with their high crystallinity, the fibers and filaments according to the invention are distinguished by high thermal stability, low boiling-induced and thermal shrinkage and by the minimal tendency to creep at high temperatures. The fibers and filaments according to the invention are also characterized by high strength, a high modulus of elasticity and high resistance to chemicals.

the fibers and filaments according to the invention are also distinguished by their particularly high thermal stability which is up to about 70° K. higher than the thermal stability of normal polyphenylene sulfide.

Thermal stabilities as high as this are otherwise only achieved by considerably more expensive materials, for example polyether ketones and polyimides.

The fibers and filaments according to the invention are suitable, for example, for the production of protective clothing, nonwovens, for example for filtration and for electrolysis membranes.

EXAMPLE 1

(70 MOL-% biphenyl sulfide units, PAS-B-70)

3,105 g N-methyl caprolactam (NMC), 232.8 g (1.58 mol) 1,4-dichlorobenzene and 824 g (3.69 mol) 4,4'-dichlorobiphenyl are introduced under nitrogen into and heated to 210°-215° C. in a 5 liter tank reactor equipped with a stirrer, thermometer, heavy-phase water separator, reflux condenser and dropping funnel. A solution heated to approximately 80° C. of 742 g sodium sulfide hydrate (5.80 mol $Na_2S$) and 89.6 g (0.79 mol) ε-caprolactam in approximately 260 g water is then added dropwise with vigorous stirring over a period of 90 to 120 minutes at such a rate that the water introduced can be azeotropically removed at the same time with 1,4-dichlorobenzene. To maintain stoichiometry, the 1,4-dichlorobenzene distilled off is returned to the tank reactor after separation of the water. After the addition and after the water has been removed, the mixture is slowly heated to 23020 C. and stirred for another 25 h at ≧230° C. The polyarylene sulfide is worked up by precipitation of the reaction mixture with vigorous stirring in a large excess of isopropanol, filtration and washing of the residue with isopropanol.

The residue is taken up in water, acidified to pH 1–2 with aqueous $H_2SO_4$ and washed with water until neutral, followed by drying for 12 h at 120° C. in a vacuum drying cabinet. The polyarylene sulfide has a maximum melting point of 355° to 358° C. and an $\overline{M}_w$ of 35,300 (see FIG. 1).

EXAMPLE 2

2,464 g N-methyl caprolactam, 202.4 g 1,4-dichlorobenzene and 358.4 g 4,4'-dichlorodiphenyl are introduced into, and heated to the reflux temperature in, a 5 liter tank reactor equipped with a thermometer, stirrer, coolable column, distillate divider, reflux condenser and two dropping funnels. A mixture of 647.8 g sodium sulfide hydrate (approx. 60% sodium sulfide), 103.9 g caprolactam and 262 g water is added dropwise over a period of 90 minutes at such a rate that the water introduced can be simultaneously removed azeotropically with 1,4-dichlorbenzene. At the same time, another 358.4 g 4,4'-dichlorodiphenyl in 460 g N-methyl caprolactam are added to the reaction mixture over a period of approximately 70 minutes. To maintain stoichiometry, the 1,4-dichlorobenzene distilling off is returned to the reaction mixture after removal of the water. After the addition and after the water has been removed, the column is switched to reflux, the reaction mixture is heated at the reflux temperature for another 25 hours and the product is then isolated in the usual way. The product has a melting point Tm of 369° C. and Mw of 14,000.

EXAMPLE 3

The procedure is as in Example 1, except that 4.2 g 1,3,5-trichlorobenzene were additionally introduced. The product had a melting point of 354° C. and an Mw of 65,000.

COMPARISON EXAMPLE I (Example (b) of EP-A 287 396, half batch size)

39 g (0.125 mol) 4,4'-dibromobiphenyl, 18.4 g (0.125 mol) 1,4-dichlorobenzene and 19.5 g (0.25 mol) sodium sulfide, anhydrous, were polymerized for 5 hours at 220° C. in the presence of 6.75 g water, 248 g N-methyl pyrrolidone and 1 g sodium hydroxide. A pressure of approx. 5 bar was reached. When melted for the first time, the product had a melting point of 370° C. which was no longer observed in the second melting. It had an Mw of 11,800 with pronounced bimodal distribution.

COMPARISON EXAMPLE II (PAS-B-50 from dichlorobiphenyl)

The procedure was as in Example 1, except that 588.4 g (2.635 mol) 4,4'-dichlorobiphenyl and 386.5 g (2.635 mol) 1,4'-dichlorobenzene are used.

COMPARISON EXAMPLE III (PAS-B-70 from dibromobiphenyl)

The procedure was as in Example 1, except that 1,152.7 g (3.69 mol) 4,4'-dibromobiphenyl, 232.8 g (1.58 mol) 1,4'-dichlorobenzene and 4,000 g NMC are used.

TABLE 1

(Comparison of bromo- and chlorobiphenylenes)

| Example | 4,4'-di-bromobiphenyl (mol-%) | 4,4-di-chlorobiphenyl (mol-%) | 1,4-di-chlorobenzene (mol) | Solvent | $\overline{M}_w$ |
|---|---|---|---|---|---|
| Example 1 (invention) | — | 70 | 30 | NMC | 35,300[1] |
| Comp. III | 70 | — | 30 | NMC | 11,700[2] |
| Comp. I | 50 | — | 50 | NMC | 11,800[3] |
| Comp. II (invention) | — | 50 | 50 | NMC | 77,800[4] |

Figure 3:
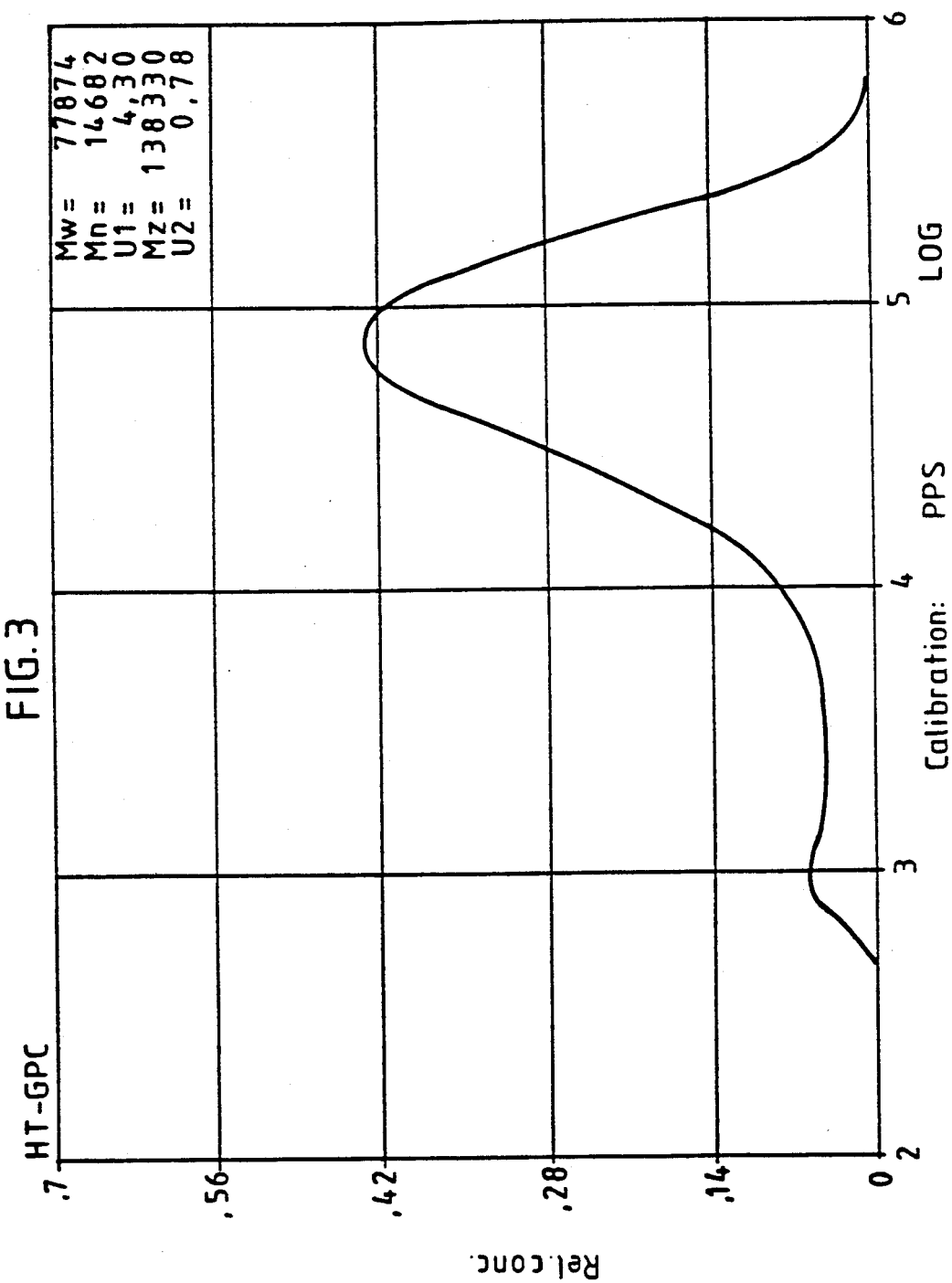

[1] see FIG. 1.
[2] see FIG. 4.
[3] see FIG. 2.
[4] see FIG. 3

EXAMPLE 4

(PAS-B-70, low molecular weight)

The procedure and reaction mixture are as in Example 1, except that the reaction is terminated after 8 h at a reaction temperature of 230° C. and the reaction product is worked up as previously described. The polyarylene sulfide has an $\overline{M}_w$ of 13,400.

TABLE 2

(Non-uniformity U in dependence upon the aromatic halogen compounds used)

| Example | 4,4'-dibromobiphenyl mol-% | 4,4'-dichlorobiphenyl mol-% | $\overline{M}_w$ | U |
|---|---|---|---|---|
| Ex. 4 (invention) | — | 70 | 13,400 | 1.90 |
| Comp. III | 70 | — | 11,700 | 3.45 |

EXAMPLE 5

(PAS-B-60)

The procedure is as in Example 1, except that 614.4 g (2.75 mol) 4,4'-dichlorobiphenyl, 270 g (1.84 mol) 1,4-dichlorobenzene, 636.3 g sodium sulfide hydrate (4.93 mol Na$_2$S), 77.9 g (0.60 mol) caprolactam and 2,820 g NMC are used.

EXAMPLE 6

(PAS-B-65)

The procedure is as in Example 5, except that 665.6 g (2.98 mol) 4,4'-dichlorobiphenyl, 236.2 g (1.61 mol) 1,4-dichlorobenzene and 2,890 g NMC are used.

EXAMPLE 7

(PAS-B-75)

The procedure is as in Example 5, except that 768 g (3.44 mol) 4,4'-dichlorobiphenyl, 168.7 g (1.15 mol) 1.4-dichlorobenzene and 2,990 g NMC are used.

EXAMPLE 8

(PAS-B-80)

The procedure is as in Example 5, except that 819 g (3.67 mol) 4,4'-dichlorobiphenyl, 135 g (0.92 mol) 1,4-dichlorobenzene and 3,050 g NMC are used.

TABLE 3

(Effect of the biphenylene sulfide component on the physical properties of the PAS-B)

| Example | Mol-% biphenyl | $\overline{M}_w$ | $T_S$ (°C.) | DSC (dynamic, 20° K./min) $\Delta H_S$ (J/g) | $T_K$ (°C.) | $\Delta H_K$ (J/g) |
|---|---|---|---|---|---|---|
| 5 | 60 | 54,100 | 293/367 | 21 | 273 | 10 |
| 6 | 65 | 49,800 | 303/368 | 24 | 310 | 23 |
| 1 | 70 | 35,300 | 358 | 31 | 332 | 29 |
| 7 | 75 | 18,800 | 368 | 48 | 354 | 32 |
| 8 | 80 | 15,000 | 380 | 63 | 364 | 38 |

Production of molding compounds:

The copoarylene sulfide molding compounds according to the invention were produced by mixing and homogenizing the basic components in a Werner & Pfleiderer ZSK 32 twin-screw extruder at a melt temperature of 370° C. The strands reduced to granulate were dried overnight and processed in standard injection molding machines to standard test specimens which were tested to DIN and ASTM standards (see Table 4).

TABLE 4

| | (Injection molding compounds) | | | | |
|---|---|---|---|---|---|
| | Example | | | | |
| | 9 Invention | 10 Comp. | 10a[7)] | 11 Comp. | 12 Comp. |
| PAS-B-70[1)] | 60 | 42 | | 24 | — |
| PPS[2)] | — | 18 | | 36 | 60 |
| Glass fibers[3)] | 40 | 40 | | 40 | 40 |
| E-modulus in bending [Mpa] | 11,200 | 13,400 | | 12,100 | 12,300 |
| ε6B[4)] [%] | 1.7 | 1.7 | | 1.3 | 1.9 |
| HDT-A[5)] [°C.] | 290 | 253 | 280 | 251 | 260 |
| ηM[6)] [Pa · s] | | | | | |

[1)]Produced in accordance with Example 1
[2)]Tedur PPS, M_w 38,000
[3)]Sized 10 μm glass fibers, 6 mm long
[4)]Outer fiber strain in bending test
[5)]Heat distortion temperature, method ISO-80
[6)]Melt viscosity at 380° C. at a shear rate of 10³ (1/s), as measured in a high-pressure capillary viscometer
[7)]Test specimen of Example 10 conditioned for 5 h at 250° C.

In Example 9 according to the invention, higher heat distortion temperatures are obtained without conditioning than with mixtures of polybiphenylene sulfides and PPS.

EXAMPLE 13

Production of films

Using a ZSK 32 twin-screw extruder, the copolyarylene sulfide produced in accordance with Example 3 and, for comparison, a commercial polyphenylene sulfide (Fortron 300 B, a Celanese product) are extruded from a 400 mm wide flat film die (gap width 1.0 mm) at 350° to 390° C. The melts issuing from the die are processed to 350 mm wide, 0.5 mm thick films on a four-roll stand. Since the temperature of the first take-off roller with which the polyphenylene sulfides melts come into direct contact is 30° C., amorphous films are obtained.

300×300 mm pieces of these films are then placed in a stretching frame and stretched in a ratio of 1:3 at 160° C. first in the extrusion direction and then transversely thereof. The stretching rate is 6 cm/s. Two parallel constrictions are observed transversely of the particular stretching direction, only disappearing at the end of the stretching process.

Their thickness is only 0.05 mm. After stretching, the films are heated for 20 minutes at 300° C. in the stretching frame. The mechanical properties are shown in Table 5.

TABLE 5

| Films of polyarylene sulfide according to Example 13 | | | Comparison |
|---|---|---|---|
| Tensile strength | Longitudinal | 235 | 200 MPa |
| | Transverse | 212 | 190 MPa |
| Elongation at break | Longitudinal | 40% | 35% |
| | Transverse | 50% | 45% |
| Tm as measured on the film | — | 348° C. | 281° C. |

Pieces of the film of Example 5 heated for 2 hours at 280° C. show less than 0.3% shrinkage.

EXAMPLE 14

Fibers according to the invention

The polymer produced in accordance with Example 3 was extruded through a 0.5 mm diameter single-bore die in a melt-spinning extruder. The monofilament was cooled in a water bath; the take-off rate was 200 m/minute. The monofilament was stretched in two stages on contact heaters at 160° C. (overall stretching ratio 5.3). The monofilament thus obtained showed the following textile data:
denier 23 dtex
fineness strength 3.2 cN/dtex
elongation at break 13%
initial modulus 39 cN/dtext
boiling-induced shrinkage 13%.

Wide-angle X-ray scattering of these fibers revealed a high degree of orientation, but only minimal crystallinity.

The monofilament was set under tension for 2 minutes on a godet heated to 320° C. The following textile data were obtained:
denier 24 dtex
fineness strength 3.3 cN/dtex
elongation at break 17%
initial modulus 44 cN/dtex
boiling-induced shrinkage <0.2%
shrinkage in hot air at 240° C. <0.2%

A creep test, in which 10 cm of the monofilament was heated from room temperature to 300° C. under a load of 0.1 cN/dtex and was kept at 300° C. for 1 hour, produced an elongation of 1.2% after 1 hour.

The wide-angle X-ray scattering of this monofilament revealed a highly oriented crystalline structure. After heat treatment in air for 24 hours at 300° C. in the absence of tension, the set monofilament had the following textile data:
fineness strength 3.1 cN/dtex
elongation at break 19%
initial modulus 43 cN/dtex The textile data remain substantially unchanged after the heat treatment.

EXAMPLE 16

(Comparison)

A polyphenylene sulfide produced in accordance with EP-A 171 021, melt viscosity 360 Pa.s at 306° C., was spun at 295° C. through a die comprising 30 bores 0.5 mm long and 0.25 mm in diameter.

The die filter consisted of a VA cloth with 16,000 meshes/cm².

The take-off rate was 500/minutes. The spun material was stretched in three stages (twice in boiling water and then on a contact heater at 135° C.) to a total stretching ratio of 7.1 and was then set under tension for 1 minute at 260° C.

The following textile data were obtained:
Denier 24 dtex
fineness strength 4.1 cN/dtex
elongation at break 11%
initial modulus 55 cN/dtex
boiling-induced shrinkage <0.2%
thermal shrinkage 240° C. <0.2%

A creep test after 1 hour at 240° C. under a load of 0.1 cN/dtex produced an elongation of 1%.

The textile data of the fibers of the two polymers are of the same order. However, the thermal stability of the fibers of Example 2 is distinctly higher (Tm Example 6.1: 349° C., Tm Example 6.2: 278° C.).

I claim:

1. Copolyarylene sulfide having $\overline{M}_w$ values of 11,000 to 100,000 and U values of 1.9 to 4.9 wherein U is defined by the relation $$\frac{M_w}{M_n} - 1,$$

prepared from
a) 50 to 95 mol-% of at least one dichlorobiphenyl corresponding to formulae (Va) or (Vb)

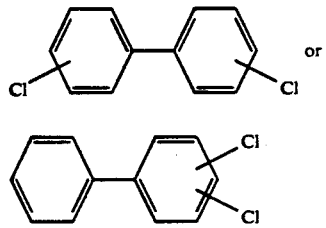

and 50 to 5 mol-% aromatic dihalogen compound corresponding to formula (VI)

$$X-A-X \qquad (VI)$$

in which A represents Ar-R and Ar and R have the following meaning:
Ar is $C_{6-24}$ C aromatic radical other than biphenyl or a heterocyclic radical containing 5 to 14 ring atoms, up to 3 ring C atoms being replaced by heteroatoms, and
R is a single bond or R is O-Ar, S-Ar, CO-Ar, SO-Ar, $So_2$-Ar where Ar is as defined above,
X is halogen, and
b) 0 to 5 mol-%, based on A), of an aromatic trihalogen or tetrahalogen compound corresponding to formula (VII)

$$Ar^2X_n \qquad (VII)$$

in which
$Ar^2$ is an aromatic $C_{6-14}$ ring or a heterocyclic radical containing 5 to 14 ring atoms, up to 3 ring C atoms being replaced by heteroatoms,
X is halogen, and
n is the number 3 or 4,
are reacted with
c) alkali sulfides or alkali hydrogen sulfides, in hydrate form or in aqueous solution, with or without alkali hydroxides, the molar ratio of (a+b):c being from 0.75:1 to 1.25:1,
d) optionally in the presence of catalysts, in an aprotic solvent in the presence of an entraining agent to remove water, the entraining agent being a dihalogen aromatic compound of formula (VI), with water removal time being from 2 to 10 hours and after water removal reaction at 230° C. to 250° C. for at least 5 hours.

2. Film produced from the copolyarylene sulfide claimed in claim 1.

3. Fiber containing the copolyarylene sulfide claimed in claim 1.

4. A molding composition comprising copolyarylene sulfide claimed in claim 1 and inorganic or organic filler or reinforcing material.

5. Shaped article comprising the polyarylene sulfide claimed in claim 1.

6. Shaped article according to claim 1 which comprises said polyarylene sulfide which contains filler or reinforcing material.

* * * * *